B. TERWILLIGER.
RAKE.
APPLICATION FILED MAY 11, 1916.
1,206,486.
Patented Nov. 28, 1916.
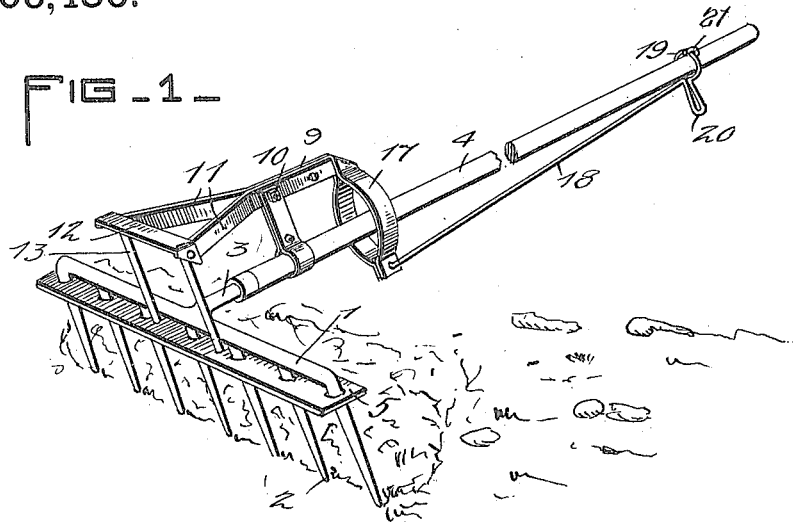
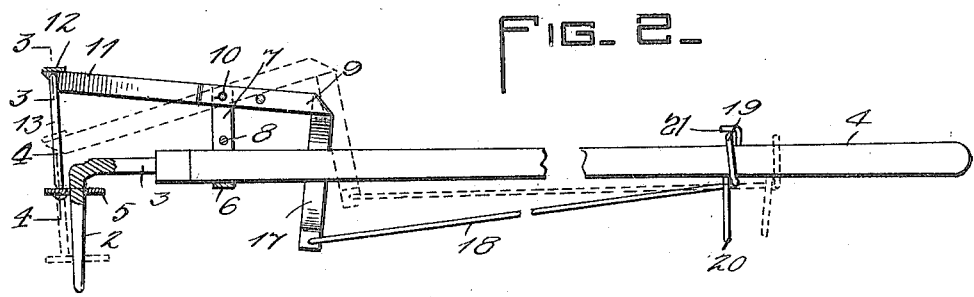
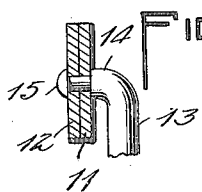
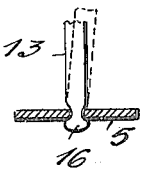
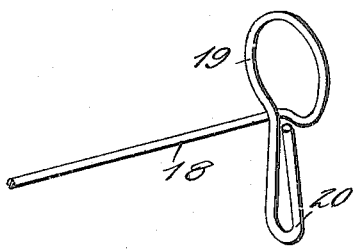
WITNESSES:
John X. Phillips Jr.
C. E. Trainor
INVENTOR
BYRON TERWILLIGER
BY Munn &Co.
ATTORNEYS

UNITED STATES PATENT OFFICE.

BYRON TERWILLIGER, OF GRANTS PASS, OREGON.

RAKE.

1,206,486.

Specification of Letters Patent.

Patented Nov. 28, 1916.

Application filed May 11, 1916. Serial No. 96,801.

*To all whom it may concern:*

Be it known that I, BYRON TERWILLIGER, a citizen of the United States, and a resident of Grants Pass, in the county of Josephine and State of Oregon, have invented a new and useful Improvement in Rakes, of which the following is a specification.

My invention is an improvement in rakes, and has for its object to provide mechanism for use in connection with rakes of ordinary construction but more especially that type known as grass rakes, wherein a plate is provided having openings for receiving the teeth and movable on the teeth to remove accumulation of leaves and the like, from the teeth of the rake, and wherein other mechanism is provided adapted to be mounted on the handle of the rake for moving the plate on the teeth.

In the drawings:—Figure 1 is a perspective view of the rake provided with the improvement, Fig. 2 is a side view with parts in section, Figs. 3 and 4 are sections on the lines 3—3 and 4—4, respectively, of Fig. 2, and Fig. 5 is a perspective view of one end of the operating link.

The present embodiment of the invention is shown in connection with a rake comprising a body portion 1, having a series of laterally extending teeth 2, the body having a shank 3 extending at right angles to the teeth and adapted to engage an axial opening in a handle 4. A plate 5 is provided with suitable dimensions and having openings spaced to correspond with the spacing of the teeth and adapted to receive the teeth, and the plate is arranged on the teeth as shown in Figs. 1 and 2.

A split ring 6 is provided for embracing the handle, and the ring has radial lugs 7 at the split. A bolt or rivet 8 is passed through the lugs adjacent to the ring, and a lever 9 is pivoted between the lugs at their outer ends, the lever being connected to the lugs by means of a bolt and nut 10. The lever is forked at the end adjacent to the rake body and the arms 11 of the fork are connected by a transverse plate 12.

The plate 12 and the arms 11 are connected to the cleaning plate 5 by means of hangers 13, the said hangers serving also to connect the plate 12 with the arms 11. The upper end of each hanger is bent laterally outward as shown at 14 and this outwardly bent end of each hanger is reduced to engage registering openings in the adjacent arm and in the adjacent end of the plate 12, and the outer end of each hanger is headed as shown at 15 to hold the parts in place. The lower end of each hanger is passed through an opening in the plate 5, and is headed below the plate as shown at 16 to loosely connect the plate to the hanger.

As shown in Fig. 1, in the present instance, the lever 9 is composed of two superposed portions secured together intermediate their ends and bent outwardly at one end to form the arms 11, the opposite end being bent to form a ring 17. This ring 17 fits over the handle loosely as shown in Fig. 1, depending from the adjacent end of the lever and a link 18 is connected to the ring below the handle. The end of the link remote from the ring 17 is bent to form a ring 19, slidable on the handle and a grip 20 for manipulating the lever. It will be evident that when the lever is drawn toward the end of the handle remote from the rake body the lever 9 will be swung in a direction to move the plate 5 downward with respect to the teeth to remove any accumulations therefrom. A movement of the link in the opposite direction will lift the plate into the position of Figs. 1 and 2. The two positions of the parts are clearly shown in full and dotted lines in Fig. 2. A catch 21 is provided for engaging the ring 19 to hold the plate 5 in elevated position.

I claim:—

1. The combination with the rake, of a plate having openings for the teeth and mounted to move longitudinally thereof, a bearing bracket for engaging the handle of the rake, a lever pivoted to the bracket and having a fork at the end adjacent to the plate, hanger rods connecting the arms of the fork with the plate, the lever having at the other end a ring loosely fitting over the handle, and a link pivoted at one end to the ring at the opposite side from the lever and having at the other end a bearing mounted to slide on the handle, and a grip for operating the link.

2. A cleaning plate for rake teeth having openings for teeth and adapted to be mounted thereon, a bearing bracket for engaging the handle, a lever pivoted intermediate its ends to the bracket and connected at one end to the plate, a ring rigid with the other end of the lever and adapted to encircle the handle, and a link connected with the ring at the opposite side from the lever and having a handle member provided with a ring adapted to encircle the handle of the rake.

BYRON TERWILLIGER.

Copies of this patent may be obtained for five cents each, by addressing the "Commissioner of Patents, Washington, D. C."